United States Patent
Michels

(10) Patent No.: US 11,951,469 B2
(45) Date of Patent: Apr. 9, 2024

(54) DEVICE FOR STORING REAGENT CONTAINERS ON SEVERAL PLANES

(71) Applicant: Siemens Healthcare Diagnostics Products GmbH, Marburg (DE)

(72) Inventor: Thorsten Michels, Gross-Gerau (DE)

(73) Assignee: Siemens Healthcare Diagnostic Products GmbH, Marburg (DE)

(*) Notice: Subject to any disclaimer, the term of this patent is extended or adjusted under 35 U.S.C. 154(b) by 956 days.

(21) Appl. No.: 16/892,904

(22) Filed: Jun. 4, 2020

(65) Prior Publication Data
US 2020/0384456 A1    Dec. 10, 2020

(30) Foreign Application Priority Data

Jun. 6, 2019  (EP) .................................. 19178702

(51) Int. Cl.
| | | |
|---|---|---|
| *B01L 3/02* | (2006.01) | |
| *B01L 3/00* | (2006.01) | |
| *B01L 9/00* | (2006.01) | |
| *G01N 35/10* | (2006.01) | |

(52) U.S. Cl.
CPC .............. *B01L 3/021* (2013.01); *B01L 3/502* (2013.01); *B01L 9/54* (2013.01); *G01N 35/1002* (2013.01); *G01N 35/1083* (2013.01); *B01L 2200/025* (2013.01); *B01L 2200/16* (2013.01); *G01N 2035/1086* (2013.01)

(58) Field of Classification Search
None
See application file for complete search history.

(56) References Cited

U.S. PATENT DOCUMENTS

| | | |
|---|---|---|
| 7,303,139 B1 | 12/2007 | Rudloff |
| 2010/0132484 A1 | 6/2010 | Schacher et al. |
| 2015/0126412 A1* | 5/2015 | Hunter ..................... C12Q 1/34 |
| | | 506/40 |
| 2017/0219615 A1* | 8/2017 | Matsumoto ............ G01N 21/76 |
| 2019/0004075 A1 | 1/2019 | Ackermann et al. |

FOREIGN PATENT DOCUMENTS

| | | | |
|---|---|---|---|
| CA | 2650258 | * 3/1995 | ............. G01N 35/02 |
| EP | 2261675 A2 | 12/2010 | |
| EP | 2746774 A1 | 6/2014 | |
| JP | H-10267936 A | 10/1998 | |

* cited by examiner

*Primary Examiner* — Ann Montgomery
(74) *Attorney, Agent, or Firm* — Dugan & Dugan, PC

(57) ABSTRACT

A device for storing reagent containers on several planes for an automatic analysis appliance comprises a pipetting device comprising a pipetting needle for pipetting of reagents, a first device comprising a plurality of first receiving positions for reagent containers, wherein the first receiving positions are arranged on a first plane, and a second device comprising a plurality of second receiving positions for reagent containers, wherein the second receiving positions are arranged on a second plane.

14 Claims, 2 Drawing Sheets

DEVICE FOR STORING REAGENT CONTAINERS ON SEVERAL PLANES

CROSS REFERENCE TO RELATED APPLICATION

This claims priority to European Patent Application No. EP 19178702.7, filed Jun. 6, 2019, which is hereby incorporated by reference herein in its entirety for all purposes.

FIELD

The invention relates to a device for storing reagent containers on several planes for an automatic analysis appliance.

BACKGROUND

Nowadays, many detection and analysis methods for determining physiological parameters in samples of body fluids or in other biological samples are carried out in an automated manner and in large numbers in automatic analysis appliances or so-called in vitro diagnostics systems.

Today's analysis appliances are able to carry out a large number of detection reactions and analyses with one sample. To be able to carry out a large number of tests in an automated manner, various devices are needed for the spatial transfer of measurement cells, reaction containers and reagent containers, e.g., transfer arms with a gripping function, transport belts or rotatable transport wheels, and devices for transfer of liquids, e.g., pipetting devices. The appliances comprise a control unit which, by means of suitable software, is able, largely independently, to plan and work out the work steps for the desired analyses.

Many of the analysis methods used in such automated analysis appliances are based on optical techniques. These methods permit the qualitative and quantitative detection of analytes, i.e., the substances to be detected or to be determined in samples. Clinically relevant parameters, for example, the concentration or activity of an analyte, are often determined by means of a portion of a sample being mixed with one or more test reagents in a reaction vessel, which can also be the measurement cell, as a result of which, for example, a biochemical reaction or a specific binding reaction is started which brings about a measurable change in an optical or other physical property of the test mixture.

In medical apparatus such as diagnostic analyzers for automatic analysis and examination of, for example, in vitro samples of biological body fluids, the required reagents are, for example, introduced into a measurement cuvette by means of a pipetting device with a pipetting needle. The measurement cuvette, with a cuvette gripper, is moved in this case automatically to different positions inside the automatic analysis appliance by means of a robot arm, which is part of a robot station. After the measurement, the used measurement cuvette is disposed of through a waste shaft into a waste container.

In automatic analyzers of this kind, consumables such as reagents are stored in the appliance in order to permit an automatic operation over a longer period of time or to permit analysis of a larger number of samples. This is typically done by arranging reagents in reagent containers disposed flat on rotatable reagent wheels or on trays in the appliance. Since a larger number of reagents is typically required, a large surface area is needed for storing the reagents on the appliance. However, this is very disadvantageous as regards the floor space or footprint needed for the analyzer on account of its corresponding size in the laboratory.

Consequently, the devices from the prior art do not allow a larger number of reagent containers to be arranged in an automatic analyzer without correspondingly increasing the floor space or footprint in the laboratory.

SUMMARY OF THE INVENTION

The object of the invention is therefore to permit an automatic operation of an analyzer over a longer period of time or to permit the analysis of a larger number of samples, without the analyzer requiring an increased floor space or footprint in the laboratory.

This object is achieved, according to the invention, by the subjects and methods described below.

It has been found that an improved device for storing reagent containers in automatic analyzers can be obtained if the reagent containers are stored on several planes above one another, wherein the arrangement is configured so as to ensure that the reagent containers on all of the planes can be accessed vertically from above by a pipettor.

According to the invention, this can be achieved by rotatable wheels being arranged above one another. In this case, a position of the upper wheel or of the upper wheels must be provided in which, for example, a pipetting needle or another charging unit can pass through the upper wheel or the upper wheels in order to access the lower wheel or the lower wheels.

According to the invention, this can likewise be achieved if the vessels are arranged above one another on planes which are easily displaced or actively displaceable with respect to each other, such that, for example, a pipetting needle or another charging unit can pass through the upper plane or the upper planes in order to access the lower plane or the lower planes.

This has the advantage that, while the surface area required remains the same, the number of vessels or reagent containers can be greatly increased, thus permitting an automatic operation of an analyzer over a longer period of time or the analysis of a larger number of samples, without the analyzer requiring an increased floor space or footprint in the laboratory.

The subject matter of the present invention is in particular a device for storing reagent containers on several planes for an automatic analysis appliance, the device comprising:
 a pipetting device comprising a pipetting needle for pipetting of reagents,
 a first device comprising a plurality of first receiving positions for reagent containers, wherein the first receiving positions are arranged on a first plane,
 a second device comprising a plurality of second receiving positions for reagent containers, wherein the second receiving positions are arranged on a second plane,
 wherein the second device is arranged at least in part above the first device,
 wherein the second plane is arranged at least in part above the first plane,
 wherein the pipetting needle is arranged at least in part above the first device and the second device,
 wherein the first receiving positions on the first plane and/or the second receiving positions on the second plane are displaceable and/or each rotatable about an axis,
 wherein a cutout is provided in the second device in the second plane, wherein the pipetting device, by means of the pipetting needle, can reach through the cutout from above and access at least one reagent container arranged for pipetting in one of the first receiving positions.

In a preferred embodiment, the device comprises a plurality of second devices, wherein the second devices are each arranged at least in part above one another above the first device.

In a preferred embodiment, the cutout, by rotation and/or displacement of the first receiving positions on the first plane and/or of the second receiving positions on the second plane and/or by rotation and/or displacement of the first device and/or of the second device, can in each case be arranged such that the pipetting device, by means of the pipetting needle, can reach through the cutout from above and successively access several reagent containers arranged in first receiving positions.

In a preferred embodiment, the pipetting device, by means of the pipetting needle, can access all of the reagent containers arranged in second receiving positions.

In a preferred embodiment, the axis of the first device and the axis of the second device are configured as a common axis, wherein rotations of the first device and of the second device about the axis can take place independently of each other.

In a preferred embodiment, the axis runs parallel to a normal of the first and/or second plane.

In a preferred embodiment, the first device and/or the second device is configured as a reagent wheel that is able to turn about the axis, preferably as a rotatable reagent wheel.

In a preferred embodiment, the first device and/or the second device are connected movably to each other.

In a preferred embodiment, the normals of the first and second plane are parallel, and wherein the normal of the first and/or second plane preferably runs parallel to the direction vector of the force of gravity.

In a preferred embodiment, the pipetting device and/or the pipetting needle is movable, preferably parallel and/or perpendicular to the normal of the first and/or second plane.

In a preferred embodiment, the cutout has the shape of a segment of a circle, a circle, an oval, a square or a triangle.

In a preferred embodiment, the device comprises a transfer device for transferring reagent containers to and/or from the first receiving positions and/or second receiving positions. The transfer device can preferably access at least one of the first receiving positions from above through the cutout.

Alternatively, the vessels or reagent containers are stored vertically, and, when it is necessary for them to be accessed by the pipetting device, the vessels or reagent containers are driven out into an access plane, similarly to the way automobiles drive onto a level of a multi-story carpark, which corresponds to the storage system here, and then drive down and out, where, for example, the access can then take place on a level that corresponds to the street level, for example.

A further subject of the invention is a method for storing reagent containers on several planes for an automatic analysis appliance with the aid of a device according to the invention for storing reagent containers on several planes for an automatic analysis appliance, the method comprising the following steps:
arranging at least one first reagent container in one of the first receiving positions,
using the pipetting needle to access the first reagent container from above through the cutout.

In a preferred embodiment, the method further comprises the following steps:
arranging at least one second reagent container in one of the first receiving positions,
arranging the cutout, by rotation and/or displacement of the first receiving positions on the first plane and/or of the second receiving positions on the second plane and/or by rotation and/or displacement of the first device and/or of the second device, such that the cutout is located above the second reagent container,
using the pipetting needle to access the second reagent container from above through the cutout.

A further subject of the invention is an analysis appliance, which comprises an aforementioned device according to the invention for storing reagent containers on several planes for an automatic analysis appliance. Moreover, the analysis appliance advantageously preferably comprises an automatic vessel gripper.

A further subject of the invention is the use of a device according to the invention for storing reagent containers on several planes for an automatic analysis appliance, wherein the automatic analysis appliance preferably comprises an automatic vessel gripper.

Within the meaning of the invention, a "sample" is to be understood as the material that is suspected to contain the substance to be detected (the analyte). The term "sample" comprises, in particular, biological liquids of humans or animals, e.g., blood, plasma, serum, sputum, exudate, bronchoalveolar lavage, lymph fluid, synovial fluid, seminal fluid, cervical mucus, feces, urine, cerebrospinal fluid, but also, for example, tissue or cell culture samples that have been suitably prepared by homogenization or cell lysis for photometric determination, preferably nephelometric determination. Moreover, plant liquids or tissues, forensic samples, water and waste water samples, foods and pharmaceuticals, for example, can also serve as samples which, if appropriate, are intended to undergo a corresponding preliminary sample treatment step before the determination.

Quantitative detection involves measuring the amount, the concentration or the activity of the analyte in the sample. The expression "quantitative detection" also covers semi-quantitative methods, which can detect only the approximate amount, concentration or activity of the analyte in the sample or can serve only to provide a relative indication of amount, concentration or activity. Qualitative detection is to be understood as the detection of the actual presence of the analyte in the sample, or the indication that the amount, concentration or activity of the analyte in the sample is below or above a defined threshold value or several defined threshold values.

A measurement cuvette is, for example, a cuvette or a reaction vessel made of glass, plastic or metal.

Advantageously, the measurement cuvette is produced from optically transparent materials, which can be advantageous particularly when using optical analysis methods.

The terms "measurement cuvette" and "cuvette" are used synonymously and designate the same subject matter.

The terms "analysis appliance" and "analyzer" are used synonymously here and designate the same subject matter.

BRIEF DESCRIPTION OF THE DRAWINGS

The invention is explained in more detail on the basis of examples and with reference to drawings, in which.

DETAILED DESCRIPTION OF THE INVENTION

Figure 1:
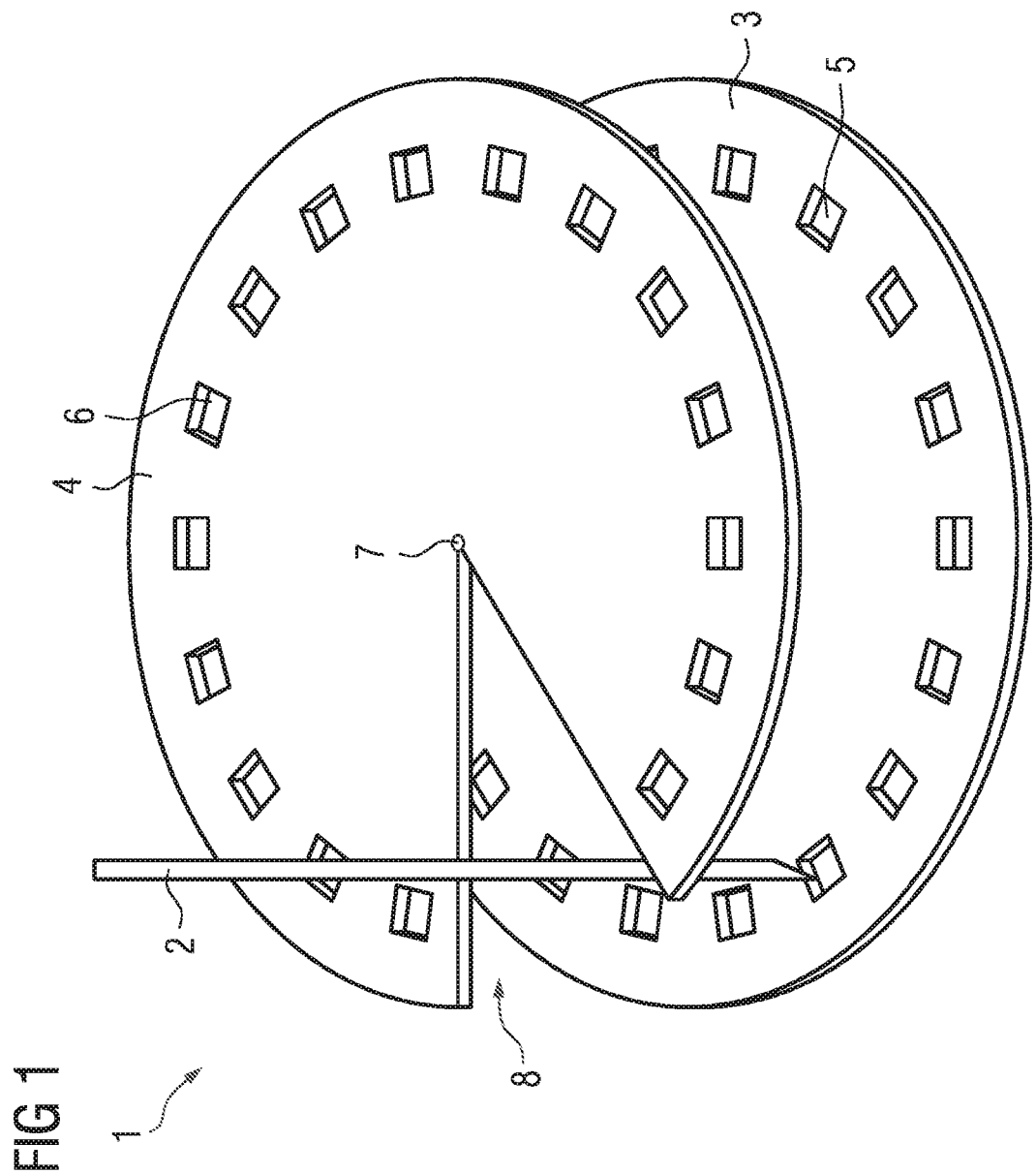
FIGS. 1 and 2 show schematic views of the structure of different embodiments of a device (1) for storing reagent containers on several planes for an automatic analysis appliance.
Figure 2:
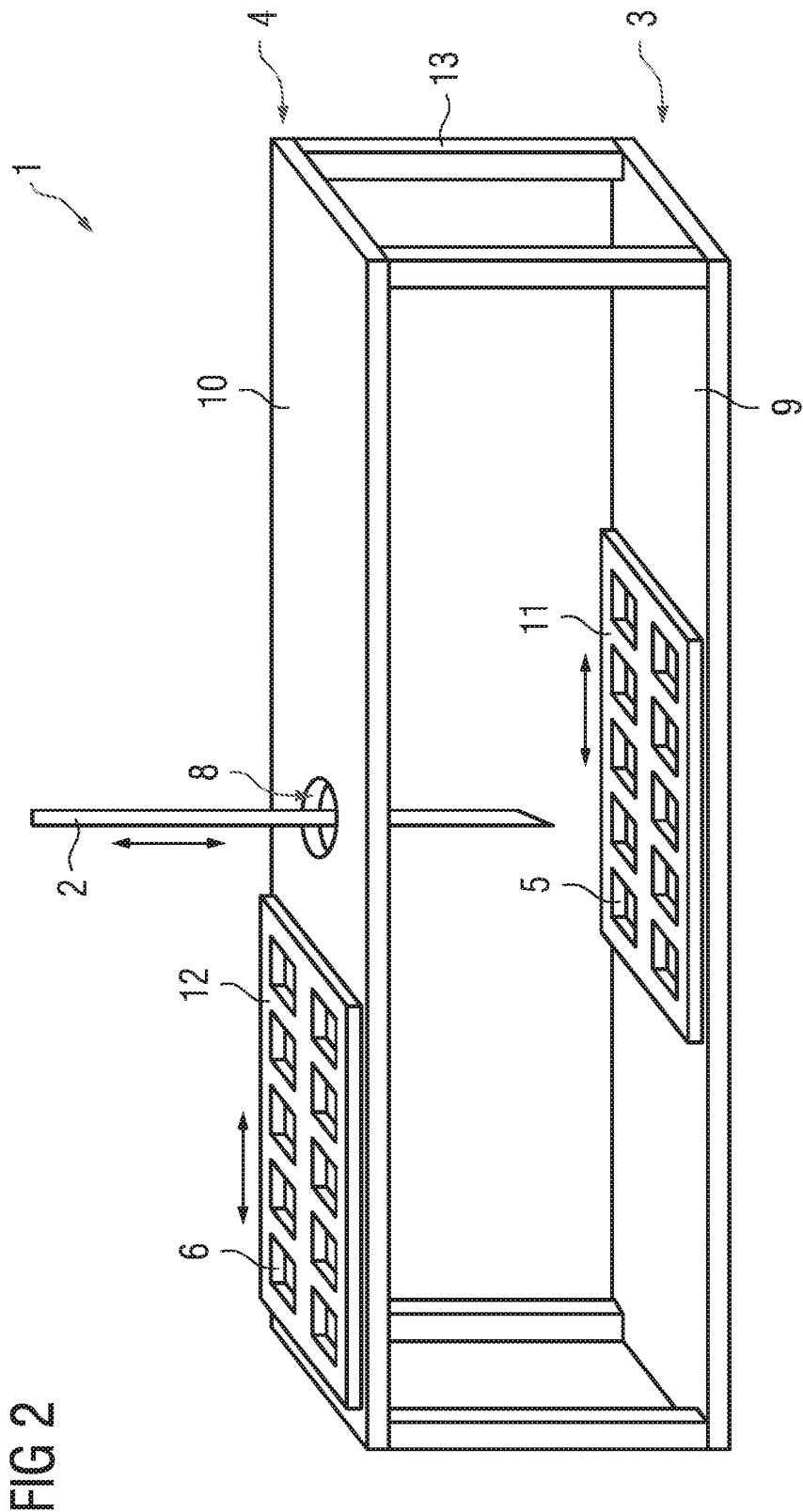

The device (1) according to FIG. 1 or FIG. 2 is embedded in an analysis appliance (not shown) which is designed to perform a large number of analyses of samples. For this purpose, the automatic analysis appliance comprises a large number of pipetting devices (not shown) and transport devices (not shown) and also a control unit for automated control of a method according to the invention for storing reagent containers on several planes for an automatic analysis appliance by means of a device according to the invention for storing reagent containers on several planes for an automatic analysis appliance.

The embodiment of the device (1) shown in FIG. 1 for storing reagent containers on several planes for an automatic analysis appliance comprises a pipetting device comprising a pipetting needle (2) for pipetting of reagents.

Furthermore, the device (1) comprises a first device (3) comprising a plurality of first receiving positions (5) for reagent containers, wherein the first receiving positions (5) are arranged on a first plane, and a second device (4) comprising a plurality of second receiving positions (6) for reagent containers, wherein the second receiving positions (6) are arranged on a second plane. The first device (3) and the second device (4) are configured as rotatable reagent wheels.

The second device (4) is arranged above the first device (3), and the second plane is arranged above the first plane. The pipetting needle (2) is arranged in part above the first device (3) and the second device (4). The first receiving positions (5) on the first plane and the second receiving positions (6) on the second plane are in each case rotatable about an axis (7).

A cutout (8) is provided in the second device (4) in the second plane, wherein the pipetting device, by means of the pipetting needle (2), can reach through the cutout (8) from above and access reagent containers arranged for pipetting in the first receiving positions (5). The cutout (8) is configured in the shape of a segment of a circle. The segment of a circle has a sufficient size to allow the pipetting needle (2) to reach through the cutout (8) and access the reagent containers arranged in first receiving positions (5).

The embodiment of the device (1) shown in FIG. 2, for storing reagent containers on several planes for an automatic analysis appliance, comprises a pipetting device comprising a pipetting needle (2) for pipetting of reagents. The device (1) further comprises a first device (3) comprising a plurality of first receiving positions (5) for reagent containers, wherein the first receiving positions (5) are arranged on a first plane. The first device (3) comprises a first plate (9) and a first tray (11), wherein the first receiving positions (5) are arranged on the first tray (11).

The device (1) further comprises a second device (4) comprising a plurality of second receiving positions (6) for reagent containers, wherein the second receiving positions (6) are arranged on a second plane. The second device (4) comprises a second plate (10) and a second tray (12), wherein the second receiving positions (6) are arranged on the second tray (12).

The first tray (11) is configured to be linearly movable on the first plate (9), and the second tray (12) is configured to be linearly movable on the second plate (10).

The first device (3) and the second device (4) are connected by means of vertical connecting elements (13).

The second device (4) is arranged above the first device (3), and the second plane is arranged above the first plane. The pipetting needle (2) is arranged in part above the first device (3) and the second device (4).

A cutout (8) is provided in the second device (4) in the second plate (10) in the second plane, wherein the pipetting device, by means of the pipetting needle (2), can reach through the cutout (8) from above and access reagent containers arranged for pipetting in the first receiving positions (5). The cutout (8) is configured in the shape of a circular aperture. The circular aperture has a sufficiently large radius to allow the pipetting needle (2) to reach through the cutout (8) and access the reagent containers arranged in first receiving positions (5).

LIST OF REFERENCE SIGNS 1 device
2 pipetting needle
3 first device
4 second device
5 first receiving position
6 second receiving position
7 axis
8 cutout
9 first plate
10 second plate
11 first tray
12 second tray
13 connecting element

The invention claimed is:

1. A device for storing reagent containers on several planes for an automatic analysis appliance, the device comprising:
   a pipetting device comprising a pipetting needle for pipetting of reagents,
   a first device comprising a plurality of first receiving positions for reagent containers, wherein the first receiving positions are arranged on a first plane, and
   a second device comprising a plurality of second receiving positions for reagent containers, wherein the second receiving positions are arranged on a second plane,
   wherein:
   the second device is arranged at least in part above the first device,
   the second plane is arranged at least in part above the first plane,
   the pipetting needle is arranged at least in part above the first device and the second device,
   the first receiving positions on the first plane or the second receiving positions on the second plane are displaceable or each rotatable about an axis, and
   a cutout is provided in the second device in the second plane, wherein the pipetting device, by using the pipetting needle, can reach through the cutout from above and access at least one reagent container arranged for pipetting in one of the first receiving positions.

2. The device as claimed in claim 1, wherein the cutout, by rotation or displacement of the first receiving positions on the first plane or of the second receiving positions on the second plane or by rotation or displacement of the first device or of the second device, can in each case be arranged such that the pipetting device, by using the pipetting needle, can reach through the cutout from above and successively access several reagent containers arranged in first receiving positions.

3. The device as claimed in claim 1, wherein the pipetting device, by using the pipetting needle, can access all of the reagent containers arranged in second receiving positions.

4. The device as claimed in claim 1, wherein the axis of the first device and the axis of the second device are configured as a common axis, wherein rotations of the first device and of the second device about the axis can take place independently of each other.

5. The device as claimed in claim 1, wherein the axis runs parallel to a normal of the first or second plane.

6. The device as claimed in claim 1, wherein the first device or the second device is configured as a reagent wheel that is able to turn about the axis.

7. The device as claimed in claim 1, wherein the first device and the second device are connected movably to each other.

8. The device as claimed in claim 1, wherein the normals of the first and second plane are parallel, and the normal of the first or second plane runs parallel to the direction vector of the force of gravity.

9. The device as claimed in claim 1, wherein the pipetting device or the pipetting needle is movable, parallel or perpendicular to the normal of the first or second plane.

10. The device as claimed in claim 1, wherein the cutout has a shape of a segment of a circle, a circle, an oval, a square, or a triangle.

11. The device as claimed in claim 1, further comprising a transfer device for transferring reagent containers to or from the first receiving positions or second receiving positions, wherein the transfer device can access at least one of the first receiving positions from above through the cutout.

12. An automatic analysis appliance comprising a device as claimed in claim 1, wherein the automatic analysis appliance comprises an automatic vessel gripper.

13. A method for storing reagent containers on several planes for an automatic analysis appliance, the method comprising the following steps:
   arranging at least one first reagent container in one of a plurality of first receiving positions arranged on a first plane in a first device,
   using a pipetting needle to access the first reagent container from above through a cutout in a second device comprising a plurality of second receiving positions for reagent containers arranged on a second plane.

14. The method as claimed in claim 13, further comprising the following steps:
   arranging at least one second reagent container in one of the first receiving positions,
   arranging the cutout, by rotation or displacement of the first receiving positions on the first plane or of the second receiving positions on the second plane or by rotation or displacement of the first device or of the second device, such that the cutout is located above the second reagent container,
   using the pipetting needle to access the second reagent container from above through the cutout.

* * * * *

UNITED STATES PATENT AND TRADEMARK OFFICE
CERTIFICATE OF CORRECTION

PATENT NO. : 11,951,469 B2  
APPLICATION NO. : 16/892904  
DATED : April 9, 2024  
INVENTOR(S) : Thorsten Michels Page 1 of 1

It is certified that error appears in the above-identified patent and that said Letters Patent is hereby corrected as shown below:

On the Title Page

Item (73): Assignee, change "Diagnostic" to --Diagnostics--.

Signed and Sealed this  
Fourteenth Day of May, 2024

Katherine Kelly Vidal  
*Director of the United States Patent and Trademark Office*